US011951924B2

(12) United States Patent
Johansson

(10) Patent No.: US 11,951,924 B2
(45) Date of Patent: Apr. 9, 2024

(54) CRASH MONITORING SYSTEM FOR A VEHICLE

(71) Applicant: Volvo Car Corporation, Gothenburg (SE)

(72) Inventor: Björn Johansson, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 23 days.

(21) Appl. No.: 18/051,224

(22) Filed: Oct. 31, 2022

(65) Prior Publication Data

US 2023/0139100 A1 May 4, 2023

(30) Foreign Application Priority Data

Nov. 4, 2021 (EP) .................................... 21206494

(51) Int. Cl.
*B60R 21/01* (2006.01)
*B60R 21/0134* (2006.01)
*G01S 17/931* (2020.01)

(52) U.S. Cl.
CPC ........ *B60R 21/0134* (2013.01); *G01S 17/931* (2020.01)

(58) Field of Classification Search
CPC ........................... B60R 21/0134; B60R 21/01
See application file for complete search history.

(56) References Cited

U.S. PATENT DOCUMENTS

2008/0201042 A1* 8/2008 Cuddihy ............. B60R 21/0134
701/45
2013/0054093 A1* 2/2013 Furst .................. B60R 21/0136
701/45

(Continued)

FOREIGN PATENT DOCUMENTS

CN 106066907 B 4/2020

OTHER PUBLICATIONS

1 Extended EP Search Report for EP Application No. 21206494.3 dated May 11, 2022.

*Primary Examiner* — Sizo B Vilakazi
(74) *Attorney, Agent, or Firm* — Amin, Turocy & Watson, LLP

(57) ABSTRACT

The present disclosure relates to a crash monitoring system for a vehicle, a vehicle comprising such a crash monitoring system, a method for monitoring a vehicle crash and a computer program element for such a crash monitoring system. The crash monitoring system comprises an environment sensor unit, a vehicle information supplying unit, a crash sensor unit and a control unit. The environment sensor unit is configured to generate field data of an impending crash event between at least a first vehicle and an obstacle. The vehicle information supplying unit is configured to provide operational information of at least the first vehicle to the control unit. The crash sensor unit is configured to generate crash data during the crash event of at least the first vehicle. The control unit is configured to execute a crash simulation based on the field data and the operational information and generate predictive attribute data. The control unit is further configured to generate fused data by fusing the predictive attribute data and the crash data of the ongoing crash event for adapting the predictive attribute data to future crash events.

16 Claims, 2 Drawing Sheets

(56) References Cited

U.S. PATENT DOCUMENTS

2013/0124050 A1\* 5/2013 Jo ................... B60R 21/0134
    701/45
2015/0242552 A1\* 8/2015 Kozloski ............ B60R 21/0132
    703/8
2016/0059855 A1\* 3/2016 Rebhan ............... B60W 30/095
    701/41

\* cited by examiner

CRASH MONITORING SYSTEM FOR A VEHICLE

CROSS-REFERENCE TO RELATED APPLICATIONS

This application claims the benefit of and priority to pending EP patent application serial number 21206494.3, filed Nov. 4, 2021 and entitled "CRASH MONITORING SYSTEM FOR A VEHICLE," the entirety of which is hereby incorporated by reference herein.

TECHNICAL FIELD

The present disclosure relates to a crash monitoring system for a vehicle, a vehicle comprising such a crash monitoring system, a crash monitoring method for a vehicle and a computer program element for such a crash monitoring system.

BACKGROUND ART

Road traffic safety plays an important role as autonomous driving technology improves. Conventional vehicles are able to monitor a crash event by utilizing various sensor elements. However, the monitoring is often limited to a size of a target collision vehicle. Without knowing physical properties of the target collision vehicle such as shape, structural behavior of different manufacturers, mass etc., a reliable prediction of an impending crash is difficult, which may lead to a limited utilization of adaptive restraints of the vehicle.

SUMMARY

Hence, there may be a need to provide an improved crash monitoring system, which may facilitate more precise prediction of an upcoming crash and allow a suitable operation of occupant protecting means.

The problem is at least partially solved or alleviated by the subject matter of the independent claims of the present disclosure, wherein further aspects are incorporated in the dependent claims. It should be noted that the aspects of the disclosure described in the crash monitoring system for a vehicle, the vehicle comprising such a crash monitoring system, the crash monitoring method for a vehicle and a computer program element for such a crash monitoring system.

According to the present disclosure, a crash monitoring system for a vehicle is presented. The crash monitoring system comprises an environment sensor unit, a vehicle information supplying unit, a crash sensor unit and a control unit. The environment sensor unit is configured to generate field data of an impending crash event between at least a first vehicle and an obstacle. The vehicle information supplying unit is configured to provide operational information of at least the first vehicle to the control unit. The crash sensor unit is configured to generate crash data during the crash event of at least the first vehicle. The control unit is configured to execute a crash simulation based on the field data and the operational information and generate predictive attribute data. The control unit is further configured to generate fused data by fusing the predictive attribute data and the crash data of the ongoing crash event for adapting the predictive attribute data to future crash events.

The crash monitoring system according to the present disclosure allows more reliable prediction of the impending crash event including impact and/or severity. Accordingly, protecting means such as an airbag system may be accurately applied to protect occupants in the vehicle. In particular, the control unit may learn a field behavior of the crash event by a dynamic crash simulation using the environment sensor unit, vehicle information supplying unit and/or the crash sensor unit. Hence, more precise predictive attribute data may be generated and the control unit may continuously adapt the predictive attribute data, which may lead to reduction of injuries of the occupants.

The environment sensor unit may comprise a plurality of sensor elements configured to monitor the environment of the impending crash event. The crash event may occur between the first vehicle and the obstacle, which may be one of a passenger vehicle, a truck, a (motor-)bikes, a pedestrian, a tree, a building and a lamppost. The sensor elements may be configured to capture surroundings of the vehicle and generate field data, particularly of the impending crash event. The environment sensor unit may be further configured to identify a shape, a type, a size and/or any structural property of the obstacle. The environment sensor unit may comprise at least one of a lidar element, a radar element, an ultrasonic element, or an optical imaging element.

The lidar (light detection and ranging) element may comprise at least one light source and a receiver to measure a distance to a remote target. Whereas the radar element may determine a distance to the remote target by measuring a reflection of a high-frequency signal from the target. The ultrasonic element may utilize a single ultrasonic element for emission and reception of an ultrasonic signal reflected from the target. The optical imaging element may generate image data of the environment of the vehicle. By applying such sensor elements, a precise measurement of the field data of the vehicle and/or the crashed obstacle may be achieved. Hence, the environment sensor unit may provide a general assessment of the upcoming crash event.

The vehicle information supplying unit may be also arranged in the vehicle and configured to collect operational information of the first vehicle and/or the obstacle, in case the obstacle is a movable object. The operational information may comprise any physical and mechanical data, specification and/or property, which can influence an operation of each of the first vehicle and/or the obstacle.

Optionally, the vehicle information supplying unit may communicate with the environment sensor unit and receive field data regarding the obstacle. Based on the field data of the obstacle identified by the environment sensor unit, the vehicle information supplying unit may provide the operational information of the obstacle. The operational information of the obstacle may be invariable information such as manufacture specification, structural properties, which can be stored, for instance, in a data storage unit. Additionally or alternatively, the operational information may be related to operational decisions of the vehicle such as acceleration, braking, cruise control, lane changing, turning speed etc. Hence, the vehicle information supplying unit may complement or refine the field data generated by the environment sensor unit.

The control unit may be configured to collect the field data and the operational information and apply them to simulate the impending crash. The simulation may estimate the predictive crash attributes such as injury of the occupants and/or the vehicle, severity of the injury, crash direction and/or crash duration. Accordingly, the control unit may be capable to generate predictive attribute data, in other words diagnostic data, of the impending crash event.

During the crash event, the crash sensor unit may detect impact transmitted to the vehicle due to the crash. The crash sensor unit may comprise at least one of an imaging sensor element, a pressure sensor element, an acceleration sensor element, a crash impact sound sensing element or the like to detect the impact. Accordingly, the crash sensor unit may generate crash data relating to deformation of at least a portion of the vehicle, a change of pressure and/or structure-borne sound at a vehicle body.

The control unit may be further configured to incorporate predictive data into real detected data for adapting the predictive data to a real event. In particular, the predicted attribute data based on the field data and the operational data generated prior to the crash event may be fused with the crash data generated during the crash event. Accordingly, the crash monitoring system may obtain updated data of the predictive attribute data for future crash events, which may improve a future crash simulation. The predictive attribute data may include crash direction, crash duration, and severity of the crash event or the like.

The control unit may be an electronic control unit (ECU) of the vehicle. Alternatively, the control unit may be cloud-based to receive and process large amounts of data. In such a case, the environment sensor unit, the vehicle information supplying unit, the crash sensor unit and/or the control unit may comprise a wireless communication element to transmit data each other. The wireless communication element may comprise cellular network, Wi-Fi or the like.

In an example, the control unit is further configured, based on the fused data, to determine at least one occupant protecting means to be activated at least in the first vehicle in the ongoing crash. Generally, conventional vehicles comprise a plurality of occupant protecting means to protect the occupants from directly striking against vehicle structures in case of a vehicle collision. The occupant protecting means may comprise at least one of a seat belt limiter, a front airbag element, a knee airbag element, a lateral airbag element or an inflatable side curtain. The control unit may be configured to determine which of the plurality of occupant protecting means may be activated in the ongoing crash to safely protect the occupant(s) based on the fused data. Accordingly, the control unit may also activate two or more occupant protecting means, if necessary.

In an example, the field data comprises at least one of geographic position data and crash geometric data. The field data may comprise a set of parameters comprising at least one of a crash angle, a shape, an overlap, an identity, etc. of the first vehicle and/or the obstacle. Further, the field data may comprise environmental data of a crash location such as road situation, e.g. traffic lane, traffic signal, main street, rural area and/or any objects, i.e. buildings, trees, bus stops, streetlamp, etc. The field data may provide a basic information to perform the simulation of the impending crash. In other words, the field data may describe a schematic setup of the crash geometries for the simulation. Accordingly, based on the field data a backbone scenario for the crash simulation may be established.

In an example, the crash monitoring system further comprises a data storage unit configured to provide physical property data of at least the first vehicle and/or the obstacle to the vehicle information supplying unit. The data storage unit may be cloud-based. In case of the obstacle is also a vehicle, the data storage unit may be capable to provide the physical property data of the obstacle to the vehicle information supplying unit.

The physical property data may comprise at least one invariable parameter of the first vehicle and/or the obstacle. The invariable parameters may be at least one of structural properties such as dimensions, ground clearance, kerb weight, turning radius, type and capacity of the engine, power/weight ratio, torque/weight ratio, drivetrain, acceleration capacity, suspension, etc. Such information may be provided by a manufacturer of the vehicle, hence easily stored and updated in the data storage unit.

The data storage unit may, for instance, comprise the physical property data of various vehicles and/or various manufacturers. Thus, the data storage unit comprising large amounts of data may be preferably arranged in a cloud system, wherein at least the data storage unit and the vehicle information supplying unit may communicate each other via the wireless communication element.

If the environment sensor unit may identify at least the manufacturer and additionally a model of the obstacle vehicle, such identification information may be transmitted to the vehicle information supplying unit and/or the control unit to extract the respective physical property data from the data storage unit.

The data storage unit may be integrated in a big data system, which collects huge amounts of the physical property data of various vehicles. Several control units and/or vehicles may access the data storage system to receive the necessary physical property data simultaneously.

In an example, the crash monitoring system further comprises vehicle communication unit configured to provide traffic management data of an environment of the impending crash event to the vehicle information supplying unit. The vehicle communication unit may provide additional information about the road situation to the control unit to establish an authentic data set and/or refine the collected field data and/or the operational information for executing the reliable crash simulation. The vehicle communication unit may comprise one of vehicle to everything (V2X) means providing an infrastructure connectivity.

The vehicle to everything (V2X) means may be a communication means between a vehicle and any entity that may interact with the vehicle. The V2X means may cooperate with further specific type of communication means such as V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid). The V2X means may allow the vehicles to share objects detected by the vehicle's onboard sensors such as cameras and radars, thus afford greater awareness of the on-road objects and potential hazards around the vehicle. For instance, the V2X means may generate traffic management data on a forward collision, a blind spot, intersection movement, emergency vehicle approaching, roadworks or the like. Accordingly, the V2X means may contribute to road safety and traffic efficiency.

In an example, the crash monitoring system further comprises a cabin sensor unit. The cabin sensor unit is arrangeable at least in the first vehicle and configured to provide occupant sensing data to the control unit. The cabin sensor unit may comprise at least one cabin monitoring element configured to generate occupant sensing data which provides spatial information of the vehicle cabin including a position of the occupant(s). The cabin monitoring element may be an imaging sensor or a radar element. Accordingly, the control unit may be also capable to predict injuries of the occupants and/or impact severity caused by the ongoing crash event based on the cabin monitoring data and the predictive attribute data.

In an example, the control unit is configured to activate at least one occupant protecting means at least in the first vehicle based on the occupant sensing data. The occupant protecting means may be a part of an adaptive restraint system in the vehicle. In other words, the control unit may be able to estimate available survival space at least in the first vehicle based on the predictive attribute data and occupant sensing data. The control unit may be accordingly actuate the occupant protecting means based on the available survival space in the first vehicle to protect the occupant(s).

The occupant protecting means may comprise at least one of a seat belt limiter, a front airbag element, a knee airbag element, a lateral airbag element and an inflatable side curtain. In general, the occupant protecting means is a safety device for the occupants to minimize injury caused by directly striking between the occupants and a vehicle structure in case of a vehicle collision. The occupant protecting means may also comprise devices configured to modify or increase the survival space to further protect the occupant(s). The control unit may individually and properly activate such protecting means considering available survival space to avoid a secondary injury caused due to an incorrect actuation of the occupant protecting means.

In an example, the data storage unit comprises a crash data library, in which previous field data and/or previous crash data is stored during previous crash events. Each previous field data and/or previous crash data forms a previous crash scenario. In other words, the crash data library may be a catalogue in which data related to the crash event may be classified and/or stored. The control unit is configured to find the best matching crash scenario among the previous crash scenarios in the crash data library for executing the crash simulation.

The data storage unit may be configured to collect the field data generated by the environment sensor unit and/or the crash data generated by the crash sensor unit during each crash event. Accordingly, the previous field data and/or the previous crash data generated prior to the impending crash event may form a data set for each crash event occurred in the past. Additionally, each data set may further comprise the operational information of the crashed vehicle(s). Each data set may describe an individual previous crash scenario, which may be recorded in the crash data library of the data storage unit. In other words, each data set and/or each previous crash scenario may comprise field data, the crash data and/or the operational information of either one or both of the first vehicle and the obstacle, e.g. second vehicle.

The control unit may compare the field data and/or the operational information of the impending crash event with the previous crash scenario stored in the crash data library and search for the most matching crash scenario among the previous crash scenarios. The best matching crash scenario may be applied to execute the crash simulation of the impending crash event.

Since the data storage unit may be arranged in the cloud system, the control unit may access the data storage unit and/or the crash data library via the wireless communication element to perform the crash simulation. Accordingly, the vehicle may not need to overload its own control system to find the best matching crash scenario, but it may communicate with the crash data library to receive the best matching crash scenario. According to the crash simulation, the control unit may generate the predictive attribute data such as impending crash direction, impending crash duration, severity of the impending crash event, etc.

In an example, the crash monitoring system further comprises a local subset of the crash data library at least in the first vehicle. The local subset is configured to at least partially copy the previous scenarios from the crash data library. The control unit is configured to find the best matching crash scenario among the previous crash scenario in the local subset for executing the crash simulation. In addition to and/or as an alternative to the cloud crash data library, the vehicle(s) itself may also comprise at least a portion of the cloud crash data library, which may be arranged as the local subset of the crash data library in the vehicle.

The user and/or the manufacturer of the respective vehicle may predefine a range of the crash data library for configuring the local subset. For instance, the control unit may filter the previous crash scenarios stored in the crash data library with respect to a manufacturer, a vehicle type, a vehicle size, a number of doors, a number of seats, etc. to download filtered data in the vehicle via the wireless communication element. The control unit may be configured to match the field data and/or the operational information of the impending crash event with the previous crash scenario stored in the local subset and search for the most matching crash scenario among the previous crash scenarios for executing the crash simulation. According to the crash simulation, the control unit may generate the predictive attribute data, for instance, impending crash duration, severity of the impending crash event, etc.

In an example, the control unit is further configured to compare the predictive attribute data with the crash data of the current crash event for a validation of the predictive attribute data. Once the crash event is occurred, the crash sensor unit may generate the crash data of the first vehicle and/or the obstacle. The control unit may validate the predictive attribute data generated during the crash simulation with respect to the crash data of the current crash event. Accordingly, the control unit may assess how the predictive attribute data fit the real crash data.

In an example, the control unit is configured to store the crash data of the current crash event and/or the validation of the predictive attribute data as a new crash scenario in the crash data library. The control unit may create a new classification of the newly generated crash data and/or fused data of the predictive attribute data and the crash data and upload them in the crash data library of the data storage unit. The classification may be characterized by the first vehicle and the obstacle, e.g. second vehicle. Alternatively, if the crash data library already comprises such a classification, the control unit may update the existing crash scenario of the first vehicle and the obstacle, e.g. second vehicle according to the newly generated data. Accordingly, the crash data library may be maintained up-to date. In other words, a dynamic adaption of the crash data library may be available.

In an example, the operational information comprises speed, mass, steering angle, the physical property data and/or the traffic management data of at least the first vehicle and/or the obstacle. The operational information may comprise mechanical driving data, physical property data and/or the traffic management data. The mechanical driving data may include at least one, preferably a plurality of operational parameters of the vehicle such as speed, lateral acceleration, lateral deceleration, longitudinal acceleration and/or longitudinal deceleration, speed of cornering, etc. Together with the mechanical driving data, the physical property data and the traffic management data, the operational information may provide extensive information to reliably predict the impending crash by means of the crash simulation.

In an example, the obstacle is a second vehicle. The crash monitoring system may be not only suitable for a vehicle-object crash event but also for a vehicle-vehicle(s) crash event. In particular, if the obstacle is also a vehicle, the vehicle information supplying unit may also provide operational information of the second vehicle, which may be stored in the data storage unit. Accordingly, a reliable crash simulation between the first vehicle and the second vehicle may be achieved.

According to the present disclosure, a vehicle is presented. The vehicle comprises a crash monitoring system as described above. By conducting a field evaluation and a dynamic crash simulation, a better prediction of the crash event and an accurate utilization of occupant protecting means may be achieved.

According to the present disclosure, a crash monitoring method for a vehicle is presented. The method comprises, but not necessarily in this order
generating field data of an impending crash event between at least a first vehicle and an obstacle,
providing operational information of at least the first vehicle to the control unit,
executing a crash simulation based on the field data and the operational information and generating predictive attribute data,
generating crash data during the crash event of at least the first vehicle, and
generating fused data by fusing the predictive attribute data and the crash data of the ongoing crash event for adapting the predictive attribute data to future crash events.

According to the present disclosure, a computer program element is presented. The computer program element is configured for a driving control system as described above. The program element is adapted to perform the method steps as described above, when being executed by a processing element.

It should be noted that the above examples may be combined with each other irrespective of the aspect involved. Accordingly, the method may be combined with structural features and, likewise, the system may be combined with features described above with regard to the method.

These and other aspects of the present disclosure will become apparent from and elucidated with reference to the examples described hereinafter.

BRIEF DESCRIPTION OF DRAWINGS

Exemplary examples will be described in the following with reference to the following drawings.

DETAILED DESCRIPTION

Figure 1:
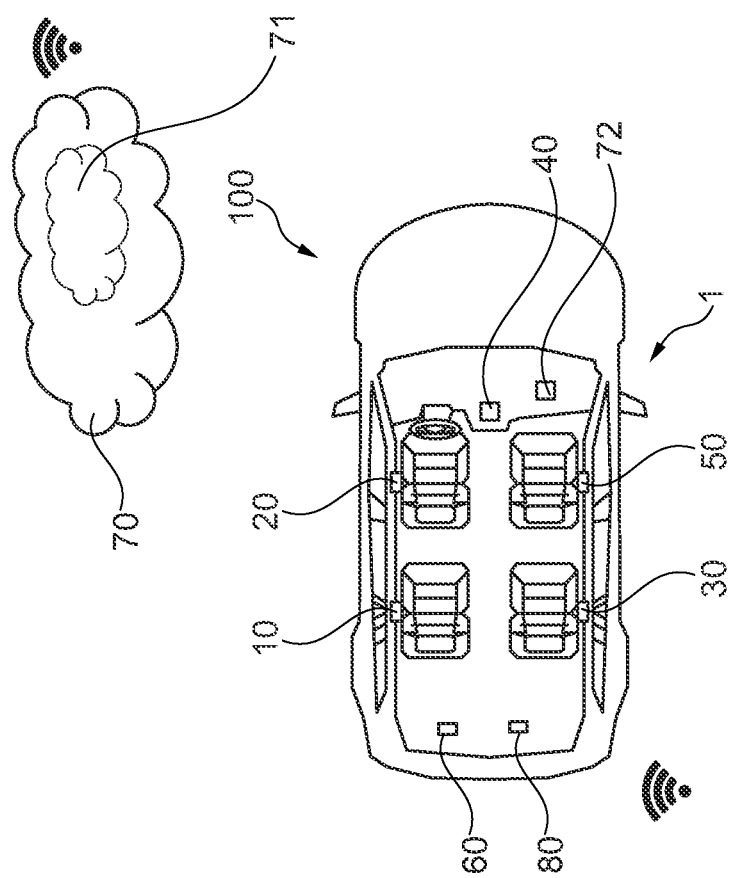
FIG. 1 shows schematically and exemplarily an example of a vehicle comprising a crash monitoring system according to the present disclosure.

FIG. 1 shows a vehicle 100 operating with a crash monitoring system 1. The crash monitoring system 1 is capable to predict an impending crash event, particularly against another vehicle, and prompt an occupants protecting means 80 to actuate correctly. Accordingly, safety of occupants in the vehicle may be increased.

The crash monitoring system 1 comprises an environment sensor unit 10, a vehicle information supplying unit 20, a crash sensor unit 30 and a control unit 40. The environment sensor unit 10 is configured to generate field data of the impending crash event between at least a first vehicle 100 and an obstacle, i.e. a second vehicle (not shown). The vehicle information supplying unit 20 is configured to provide operational information of at least the first vehicle 100 to the control unit 40. The crash sensor unit 30 is configured to generate crash data during the crash event of at least the first vehicle 100. The control unit 40 is configured to execute a crash simulation based on the field data and the operational information and generate predictive attribute data.

The crash monitoring system 1 further comprises a vehicle communication unit 50 and cabin sensor unit 60. The vehicle communication unit 50 is configured to provide traffic management data of an environment of the impending crash event to the vehicle information supplying unit. The cabin sensor unit 60 is arrangeable at least in the first vehicle 100 and configured to provide occupant sensing data to the control unit.

The crash monitoring system 1 further comprises a data storage unit 70 configured to store generated data by the diverse sensor units. The data storage unit 70 is preferably cloud-based. The data storage unit 70 is further configured to provide physical property data of at least the first vehicle 100 and/or the second vehicle to the vehicle information supplying unit 20. The physical property data may be provided for instance by a manufacturer of the first vehicle and/or the second vehicle.

The data storage unit 70 comprises a crash data library 71, in which previous crash data are stored during previous crash events. Additionally or alternatively, the crash monitoring system further comprises a local subset 72 of the crash data library 71 at least in the first vehicle 100. The local subset 72 is configured to at least partially copy the previous scenarios from the crash data library 71.

The occupant protecting means 80 comprises at least one of a seat belt limiter, a front airbag element, a knee airbag element, a lateral airbag element or an inflammatory side curtain. In general, the occupant protecting means 80 is a safety device for the occupants to minimize injury caused by directly striking between the occupants and a vehicle structure in case of a vehicle collision.

Figure 2:
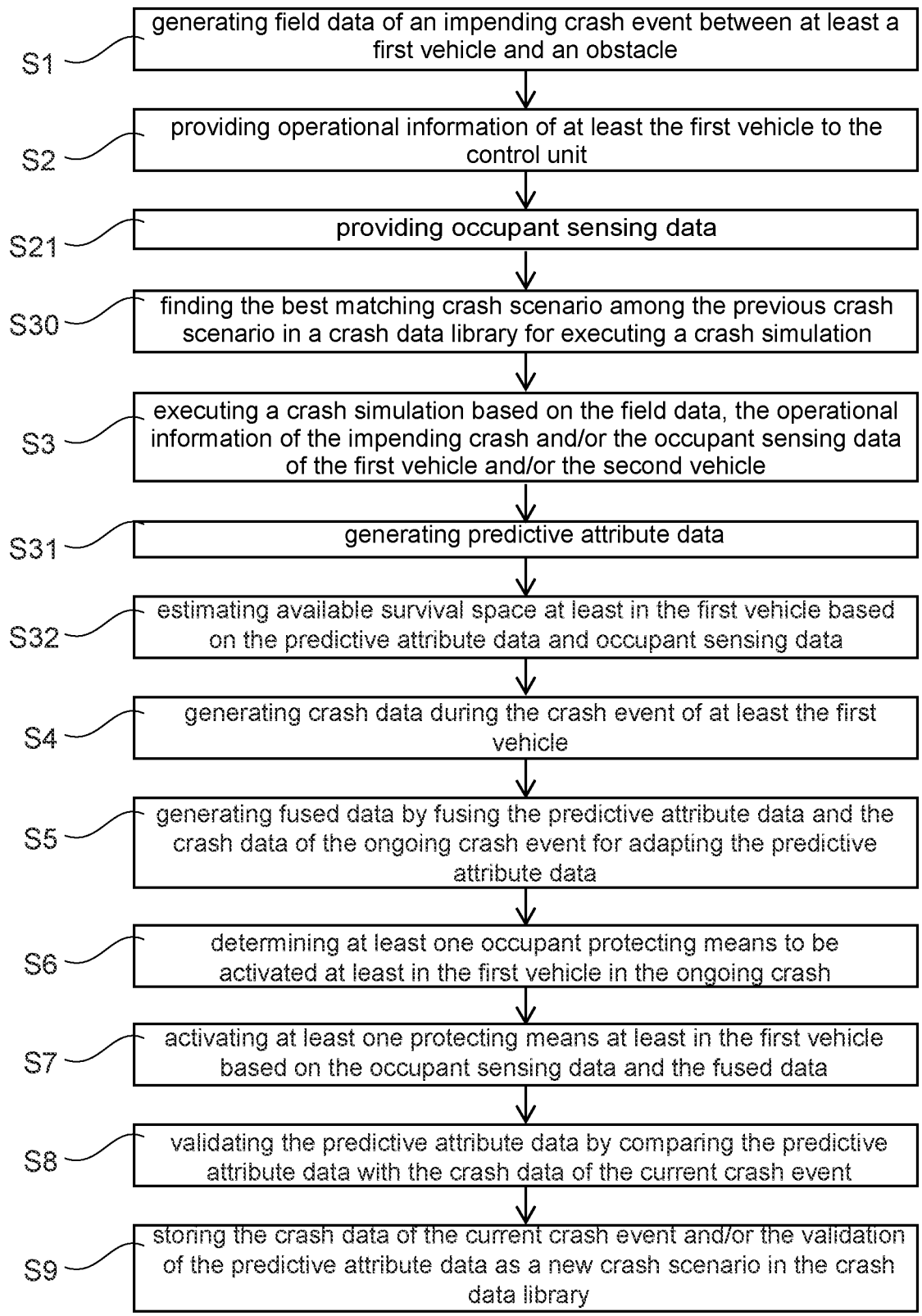
FIG. 2 shows schematically and exemplarily an example of a crash monitoring method according to the present disclosure.

FIG. 2 shows a crash monitoring method for a vehicle 100 (see also FIG. 1). The method comprises
generating S1 field data of an impending crash event between at least a first vehicle 100 and an obstacle,
providing S2 operational information of at least the first vehicle 100 to the control unit 40,
providing S21 occupant sensing data, and
finding S30 the best matching crash scenario among the previous crash scenario in a crash data library for executing a crash simulation.

The obstacle is preferably at least a second vehicle which is to be crashed against the first vehicle 100. In step S1, the field data comprises geographic position data and/or crash geometric data generated by means of an environment sensor unit 20. The environment sensor unit 20 may comprise a plurality of sensor elements configured to monitor the environment of the upcoming crash event. The environment sensor unit 20 may comprise at least one of a lidar element, a radar element, an ultrasonic element, or an optical imaging element.

The field data may comprise a set of parameters of a crash angle, a shape, an overlap, an identity, etc. of the first vehicle 100 and/or the second vehicle. Further, the field data may comprise environmental data of a crash location such as road situation, e.g. traffic lane, traffic signal, main street, rural area and/or any objects, i.e. buildings, trees, bus stops, streetlamp, etc. The field data may provide a basic information to perform the simulation of the impending crash.

In step S2, the operational information comprises mechanical driving data, traffic management data and/or physical property data of the first vehicle 100 and/or the second vehicle. The mechanical driving data include at least one, preferably a plurality of operational parameters of the vehicle such as speed, lateral acceleration, lateral deceleration, longitudinal acceleration and/or longitudinal deceleration, speed of cornering, etc. The mechanical driving data are generated either by the environment sensor unit and/or by vehicle actuator sensor unit such as accelerometers or yaw sensors.

The physical property data comprise at least one invariable parameters of the first vehicle 100 and/or the second vehicle such as dimensions, ground clearance, kerb weight, turning radius, type and capacity of the engine, power/weight ratio, torque/weight ratio, drivetrain, acceleration capacity, suspension, etc. Such information may be provided by the manufacturer of the vehicle, hence easily stored and updated in a data storage unit 70.

The traffic management data can be provided by a vehicle communication unit 50 comprising at least one of vehicle to everything (V2X) means providing an infrastructure connectivity. For instance, the V2X means generates traffic management data on a forward collision, a blind spot, intersection movement, emergency vehicle approaching, roadworks or the like.

The vehicle information supplying unit 50 is configured to collect the operational information comprising mechanical driving data, traffic management data and/or physical property data of the first vehicle and/or the second vehicle to refine the field data generated by the environment sensor unit. The vehicle information supplying unit 50 is further configured to establish an authentic data set for executing the reliable crash simulation and provide the operational information to a control unit 40.

In step S21, occupant sensing data are provided by a cabin sensor unit 60. The occupant sensing data provide spatial information of the vehicle cabin including a position of the occupant(s).

In step S30, the control unit looks for the best matching crash scenario based on the field data, the operational information and/or the occupant sensing data. The data storage unit 70 comprises a crash data library 71. The data storage unit 70 is configured to collect the previous field data and/or the previous crash data generated prior to the impending crash, which form a data set for each crash event occurred in the past. Additionally, each data set may further comprise the operational information of the crashed vehicle(s). Each data set may describe an individual previous crash scenario, which may be recorded in the crash data library 71 of the data storage unit.

The control unit 40 is configured to compare the field data and/or the operational information of the impending crash event with the previous crash scenario stored in the crash data library 71 and search for the most matching crash scenario among the previous crash scenarios. The best matching crash scenario can be applied to execute the crash simulation of the impending crash event.

Additionally, the at least a portion of the previous crash scenarios stored in the crash data library 71 of the data storage unit 70 can be selected and stored in a local subset 72 of the crash data library 71 at least in the first vehicle 100. The control unit 40 can also match the field data and/or the operational information of the impending crash event with the previous crash scenario stored in the local subset 72 and search for the most matching crash scenario among the previous crash scenarios for executing the crash simulation.

The crash monitoring method further comprises
executing S3 a crash simulation based on the field data, the operational information of the impending crash and/or the occupant sensing data of the first vehicle 100 and/or the second vehicle,
generating S31 predictive attribute data, and
estimating S32 available survival space at least in the first vehicle 100 based on the predictive attribute data and occupant sensing data.

According to the crash simulation, the control unit 40 is capable to generate the predictive attribute data including crash direction, crash duration, severity of the crash event, etc. Further, the control unit 40 can calculate the available survival space in the vehicle based on the predictive attribute data and occupant sensing data.

The crash monitoring method further comprises
generating S4 crash data during the crash event of at least the first vehicle,
generating S5 fused data by fusing the predictive attribute data and the crash data of the ongoing crash event for adapting the predictive attribute data,
determining S6 at least one occupant protecting means to be activated at least in the first vehicle in the ongoing crash.
activating S7 at least one protecting means at least in the first vehicle based on the occupant sensing data and the fused data,
validating S8 the predictive attribute data by comparing the predictive attribute data with the crash data of the current crash event, and
storing S9 the crash data of the current crash event and/or the validation of the predictive attribute data as a new crash scenario in the crash data library.

Once the crash is occurred, a crash sensor unit 30 detects impact transmitted to the vehicle 100 due to the crash. The crash sensor 30 unit may comprise at least one of an imaging sensor element, a pressure sensor element, an acceleration sensor element, a crash impact sound sensing element or the like to generate the crash data relating to deformation of at least a portion of the vehicle, a change of pressure and/or structure-borne sound at a vehicle body.

The control unit 40 is configured to merge the predictive attribute data with the real detected data of the ongoing crash event for adapting the predictive attribute data to a real event. In particular, the predicted attribute data based on the field data and the operational data may be fused with the crash data of the ongoing crash event to generate the fused data.

The control unit 40 may individually and accurately activate the occupant protecting means 80 based on the available survival space, the occupant sensing data and the fused data to avoid a secondary injury caused due to an incorrect actuation of the protecting.

The control unit 40 is further configured to validate the predictive attribute data generated during the crash simulation with the crash data of the current crash event. In other words, the control unit 40 performs an assessment how the predictive attribute data fit the real crash data.

The control unit 40 creates a new classification of the newly generated crash data and/or fused data of the predictive attribute data and the crash data and upload the new classification in the crash data library 71 of the data storage unit 70. The classification may be characterized by the first vehicle 100 and the obstacle, i.e. second vehicle. Alternatively, if the crash data library 71 already comprises such a classification, the control 40 unit may update the existing crash scenario of the first vehicle 100 and/or the second vehicle according to the newly generated data. Accordingly, the crash data library 71 may be maintained up-to date. In other words, a dynamic adaption of the crash data library 71 may be performed.

It has to be noted that examples of the disclosure are described with reference to different subject matters. In particular, some examples are described with reference to method type claims whereas other examples are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed aspects. Other variations to the disclosed examples can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A crash monitoring system for a vehicle, the crash monitoring system comprising
an environment sensor unit,
a vehicle information supplying unit,
a crash sensor unit, and
a control unit,
the environment sensor unit being configured to generate field data of an impending crash event between at least a first vehicle and an obstacle,
the vehicle information supplying unit being configured to provide operational information of at least the first vehicle to the control unit,
the crash sensor unit being configured to generate crash data during the crash event of at least the first vehicle,
the control unit being configured to execute a crash simulation based on the field data and the operational information and generate predictive attribute data, and
the control unit being further configured to generate fused data by fusing the predictive attribute data and the crash data of the ongoing crash event for adapting the predictive attribute data to future crash events.

2. The crash monitoring system according to claim 1, the control unit being further configured, based on the fused data, to determine at least one occupant protecting means to be activated at least in the first vehicle in the ongoing crash.

3. The crash monitoring system according to claim 1, the field data comprising at least one of geographic position data or crash geometric data.

4. The crash monitoring system of claim 1, further comprising a data storage unit configured to provide physical property data of at least the first vehicle or the obstacle to the vehicle information supplying unit.

5. The crash monitoring system of claim 1, further comprising a vehicle communication unit configured to provide traffic management data of an environment of the impending crash event to the vehicle information supplying unit.

6. The crash monitoring system of claim 1, further comprising a cabin sensor unit, the cabin sensor unit being arrangeable at least in the first vehicle and configured to provide occupant sensing data to the control unit.

7. The crash monitoring system of claim 1, the control unit being configured to activate at least one occupant protecting means at least in the first vehicle based on the occupant sensing data and the fused data.

8. The crash monitoring system of claim 1,
the data storage unit comprising a crash data library, in which previous field data or previous crash data being stored during previous crash events,
each previous field data or previous crash data forming a previous crash scenario, and
the control unit being configured to find the best matching crash scenario among the previous crash scenarios in the crash data library for executing the crash simulation.

9. The crash monitoring system according to claim 7, further comprising a local subset of the crash data library at least in the first vehicle, the local subset being configured to at least partially copy the previous scenarios from the crash data library, and
the control unit being configured to find the best matching crash scenario among the previous crash scenarios in the local subset for executing the crash simulation.

10. The crash monitoring system of claim 1, the control unit being further configured to compare the predictive attribute data with the crash data of the current crash event for a validation of the predictive attribute data.

11. The crash monitoring system of claim 1, the control unit being configured to store the crash data of the current crash event and/or the validation of the predictive attribute data as a new crash scenario in the crash data library.

12. The crash monitoring system of claim 1, the operational information comprising speed, mass, steering angle, the physical property data or the traffic management data of at least the first vehicle or the obstacle.

13. The crash monitoring system of claim 1, the obstacle being a second vehicle.

14. A vehicle comprising a crash monitoring system, the crash monitoring system comprising:
an environment sensor unit,
a vehicle information supplying unit,
a crash sensor unit, and
a control unit,
the environment sensor unit being configured to generate field data of an impending crash event between at least a first vehicle and an obstacle,
the vehicle information supplying unit being configured to provide operational information of at least the first vehicle to the control unit,
the crash sensor unit being configured to generate crash data during the crash event of at least the first vehicle,
the control unit being configured to execute a crash simulation based on the field data and the operational information and generate predictive attribute data, and
the control unit being further configured to generate fused data by fusing the predictive attribute data and the crash data of the ongoing crash event for adapting the predictive attribute data to future crash events.

15. A crash monitoring method for a vehicle, the crash monitoring method comprising:
   generating field data of an impending crash event between at least a first vehicle and an obstacle,
   providing operational information of at least the first vehicle to the control unit,
   executing a crash simulation based on the field data and the operational information and generating predictive attribute data,
   generating crash data during the crash event of at least the first vehicle, and
   generating fused data by fusing the predictive attribute data and the crash data of the ongoing crash event for adapting the predictive attribute data to future crash events.

16. A computer program element, for a crash monitoring system which, when being executed by a processing element, being adapted to perform steps comprising:
   generating field data of an impending crash event between at least a first vehicle and an obstacle,
   providing operational information of at least the first vehicle to the control unit,
   executing a crash simulation based on the field data and the operational information and generating predictive attribute data,
   generating crash data during the crash event of at least the first vehicle, and
   generating fused data by fusing the predictive attribute data and the crash data of the ongoing crash event for adapting the predictive attribute data to future crash events, and
   wherein the the crash monitoring system comprising
      an environment sensor unit,
      a vehicle information supplying unit,
      a crash sensor unit, and
      a control unit,
   the environment sensor unit being configured to generate field data of an impending crash event between at least a first vehicle and an obstacle,
   the vehicle information supplying unit being configured to provide operational information of at least the first vehicle to the control unit,
   the crash sensor unit being configured to generate crash data during the crash event of at least the first vehicle,
   the control unit being configured to execute a crash simulation based on the field data and the operational information and generate predictive attribute data, and
   the control unit being further configured to generate fused data by fusing the predictive attribute data and the crash data of the ongoing crash event for adapting the predictive attribute data to future crash events.

* * * * *